United States Patent [19]

Terada et al.

[11] 4,042,409
[45] Aug. 16, 1977

[54] WATER REPELLENT GYPSUM COMPOSITION

[75] Inventors: Ichiro Terada, Kamakura; Tadashi Yamada, Tokyo; Michio Nishi, Tokyo; Mitsuo Uchida, Tokyo; Naomasa Sugiyama; Mamoru Kaneko, both of Yokohama; Nobuhiko Takeda, Kawasaki, all of Japan

[73] Assignees: Mitsubishi Chemical Industries Limited; Yoshino Gypsum Co., Ltd., both of Tokyo, Japan

[21] Appl. No.: 672,540

[22] Filed: Apr. 1, 1976

[30] Foreign Application Priority Data

Apr. 3, 1975 Japan .................. 50-41041

[51] Int. Cl.$^2$ .............................. C04B 11/14
[52] U.S. Cl. ................... 106/111; 106/116; 260/28.5 R; 260/28.5 AS
[58] Field of Search .................. 106/111, 116; 260/28.5 R, 28.5 AS

[56] References Cited

U.S. PATENT DOCUMENTS

| | | | |
|---|---|---|---|
| 2,483,806 | 10/1949 | Buckley et al. | 106/116 |
| 2,526,537 | 10/1950 | Camp | 106/116 |
| 2,604,411 | 7/1952 | Riddell et al. | 106/116 |
| 2,665,148 | 10/1953 | Eberl et al. | 106/29.6 |
| 3,359,146 | 12/1967 | Lane et al. | 106/111 |
| 3,520,708 | 7/1970 | Chambers et al. | 106/111 |
| 3,775,351 | 11/1973 | Sachs | 106/116 |
| 3,935,021 | 1/1976 | Greve et al. | 106/111 |

*Primary Examiner*—Patrick P. Garvin
*Assistant Examiner*—John P. Sheehan
*Attorney, Agent, or Firm*—Oblon, Fischer, Spivak, McClelland & Maier

[57] ABSTRACT

A water repellent gypsum composition comprising a gypsum, and a paraffin emulsion prepared by emulsifying (a) paraffin hydrocarbon having a melting point of 40°-80° C and (b) an oxidized paraffin having an acid value of 10-70 at a ratio of from 97:3 to 50:50 by weight, respectively, in the presence of a water soluble alkali compound. Optionally, a polymer emulsion or solution may be added.

11 Claims, No Drawings

WATER REPELLENT GYPSUM COMPOSITION

BACKGROUND OF THE INVENTION

1. Field of the Invention

The present invention relates to water repellent gypsum compositions which have excellent characteristics not found in conventional gypsum compositions.

2. Description of the Prior Art

The Gypsum products such as gypsum boards, lath boards, decorated boards, sound-insulation boards and the like, have various characteristics depending upon the nature of gypsum, but suffer from the disadvantage that they are deteriorated by absorbing water. Accordingly, the utilization of gypsum-type construction products has been limited, although gypsum-type construction products have remarkable advantages of high flame-resistance, high sound-insulation properties, and high strength and low cost.

Most gypsum products made of gypsum boards comprise a gypsum core and paper adhered on both surfaces of the core.

Heretofore, various experiments have been conducted in attempts to prepare water-resistant gypsum board; The following methods have been proposed:

1. A water-resistant material such as cloth or paper is used to coat one or both surfaces of the gypsum board.
2. A water repellent agent such as paraffins, metal soaps, diamides, etc., is used to coat one or both surfaces of the gypsum board.
3. A water impermeable film is used to coat the surfaces of the gypsum board.
4. The water repellent agent of (2) is admixed in the core.

In cases (1) and (2), the water resistance of the gypsum boards, attained by covering or coating with the water resistant material or the water repellent agent has been unsatisfactory and the processing operation has been quite difficult for industrial operations because of inferior adhesiveness. In case (3), sufficient water resistance can be imparted for the gypsum board.

However, when the gypsum board is used after being cut, the desired water resistance cannot be imparted on the cut surface. Therefore, it is necessary to use some sort of decoration on the surface of the gypsum board, thereby causing high cost.

In case (4), it is also possible to improve water resistance, but the adhesiveness between the paper and the core is not sufficient. Thus it is difficult to use in practice.

These conventional water resistant materials and water repellent agents have been relatively difficult to be used effectively.

In general, the conventional water resistant gypsum boards are inferior to the usual gypsum boards with respect to their physical properties, especially the strength of the boards and the adhesiveness between core and paper. When gypsum boards absorb water, the physical properties are remarkably decreased.

Accordingly, there is a need for gypsum boards which have high water resistance so that they can be used as interior material or outdoor material at locations in which they will be drenched, such as bases of roofs and other water contacting places which are easily prepared and easily processed and which have the above-mentioned physical properties.

SUMMARY OF THE INVENTION

Accordingly, it is an object of the present invention to provide a water repellent gypsum product which has satisfactory physical properties especially regarding water resistance and adhesiveness between core and paper, and which have the aforementioned desirable advantages.

The object of this invention has been attained by providing a water repellent gypsum composition which comprises gypsum and an oxidized paraffin-containing paraffin emulsion or a paraffin emulsion composition containing a mixture of said paraffin emulsion and a polymer emulsion.

DETAILED DESCRIPTION OF THE PREFERRED EMBODIMENTS:

The water repellent gypsum compositions (1) comprise gypsum and a paraffin emulsion prepared by emulsifying a paraffin hydrocarbon having a melting point of 40° – 80° C and an oxidized paraffin having an acid value of from 10 – 70 at a ratio of 97:3 to 50:50 by weight in the presence of a water soluble alkali compound.

The water repellent gypsum compositions (2) comprise gypsum and the paraffin emulsion composition containing a mixture of (a) a paraffin emulsion prepared by emulsifying a paraffin hydrocarbon having a melting point of 40° – 80° C and an oxidized paraffin having an acid value of 10 – 70 at a ratio of from 97:3 to 50:50 by weight in the presence of a water soluble alkali compound; and (b) a polymer emulsion or solution having a minimum film forming temperature of lower than 80° C.

In this composition of the invention, the main component of the water repellent agents is a paraffin hydrocarbon having a melting point of 40° – 80° C. When a paraffin hydrocarbon having a melting point lower than 40° C is used, the quality of the gypsum product deteriorates in summer. On the other hand, when a paraffin hydrocarbon having a melting point higher than 80° C is used, it is necessary to dry the gypsum product at a temperature higher than 80° C, and a gypsum product having high water resistance cannot be obtained. It is preferred to dry at a temperature lower than 80° C because gypsum is dehydrated and deteriorated thereby yielding low water resistance, by drying a gypsum product at high temperature.

The oxidized paraffin to be used in this invention is prepared by oxidizing a hydrocarbon such as oxidizing α-olefins with molecular oxygen.

The oxidized paraffin used in the paraffin emulsion together with the paraffin hydrocarbon should have an acid value of 10 – 70 and a melting point of 30° – 90° C, preferably an acid value of 20 – 40 and a melting point of 40° – 80° C. When the oxidized paraffin has an acid value out of said range an emulsification using a small amount of the emulsifier is not easily attained, the stability of the paraffin emulsion is not suitable, and the effects for imparting water resistant and water repellent properties are too low.

An oxidized paraffin having a melting point in said range is preferred because of the same reasons as for of the paraffin hydrocarbon. The weight ratio of the paraffin hydrocarbon to the oxidized paraffin is preferably in the range of from 97:3 to 50:50 especially 95:5 to 70:30. When a paraffin emulsion having a weight ratio out of range is used, the effects for imparting water resistant and water repellent properties are too low.

The paraffin emulsion used as the water repellent component in the gypsum product of this invention is prepared by emulsifying the paraffin hydrocarbon and the oxidized paraffin in the presence of a water soluble alkali compound.

Suitable alkali compounds include alkali metal hydroxides such as lithium hydroxide, sodium hydroxide, potassium hydroxide, etc.; alkali metal carbonates such as lithium carbonate, sodium carbonate, potassium carbonate, etc.; sodium bicarbonate, ammonium hydroxide and the like. The amount of the alkali compound used should be enough to neutralize 30 – 300%, preferably 30 – 150%, especially 30 – 70%, of the acid value of the oxidized paraffin. When the amount of the alkali compound is too much or too little phase inversion emulsification is barely attainable or the stability of the paraffin emulsion is not satisfactory.

In general, conventional paraffin emulsions have been prepared by emulsifying a melted paraffin with 10 – 20 wt.% of an emulsifier.

On the contrary, the paraffin emulsion used as a water repellent component in this invention is prepared by emulsifying a melted paraffin with 0 to several wt.% of an emulsifier to give a stable emulsion.

That is, in the preparation of the paraffin emulsion used in this invention, the amount of the emulsifier is remarkably decreased to from 0 to several wt.% by addition of a suitable amount of an oxidized paraffin and a water soluble compound to the paraffin hydrocarbon.

The emulsifier used in an amount in the range of from 0 to small amounts in the preparation of the paraffin emulsion in this invention, should be carefully selected especially as regards the considerations of its structure and HLB.

Suitable surfactants for use as the emulsifier include nonionic surfactants such as polyoxyethylenealkylaryl ethers and esters;
polyoxyethylenealkylaryl ethers;
polypropyleneglycolpolyethyleneglycol ethers;
polyoxyethylenesorbitane fatty acid esters and sucrose esters.

The emulsifier is usually added at a ratio of 0 – 5 wt.%, preferably 1 – 3 wt.%, to the total amount of the paraffin hydrocarbon and the oxidized paraffin.

The methods of emulsifying paraffin for preparing the paraffin emulsion as a water repellent component include a mechanical emulsification and phase inversion emulsification. It is also possible to combine both methods. Suitable mechanical emulsifications include methods using a homomixer, a valve homogenizer, a colloid mill and an ultrasonic homogenizer. The method of emulsification is not critical and can be any process for preparing uniform paraffin emulsion.

When the paraffin emulsion used as the water repellent component is combined, with a polymer emulsion as a water repellent auxiliary agent for addition to a gypsum slurry, a gypsum product prepared by using the resultant hardened product displays remarkable water resistance and excellent physical properties resulting from a synergistic effect.

In order to prepare a gypsum product having excellent water resistance and adhesive properties between paper and core, it is preferred to add a paraffin emulsion composition comprising a mixture of the paraffin emulsion as a water repellent composition and a polymer emulsion which has the minimum film forming temperature of lower than 80° C, preferably 0° – 80° C, especially about room temperature, as a water repellent auxiliary component.

When a polymer emulsion or solution having a minimum film forming temperature of higher than 80° C, is used, film formation cannot be effected by drying at a temperature lower than 80° C in the preparation of the gypsum product, whereby it is difficult to impart sufficient water resistance to the gypsum product.

When it is dried at a temperature higher than 80° C, dehydration and deterioration of the gypsum itself is disadvantageously caused to decrease the water resistance of the gypsum product.

The minimum film forming temperature refers to the lowest temperature required for forming a film from the polymer emulsion as is conventional to persons skilled in the art.

Suitable polymer emulsions or solutions include polymer emulsions of acrylic acid esters such as ethyl acrylate, butyl acrylate and 2-ethylhexyl acrylate; polymer emulsions of a homopolymer or copolymer of vinyl acetate; polymer emulsions or solutions of urea derivatives such as a reaction product of urea, formaline and hexamethylenetetramine, polymer emulsions of asphalts such as commercial asphalt emulsion catiozol GM and CPE-1 (Nichireki Kagaku K.K.) and the like.

When a self-crosslinkable modified polymer emulsion is added to a polymer emulsion, the physical properties of the gypsum product can be further improved. In the preparation of the polymer emulsion, the emulsification is attained by using conventional nonionic surfactants. Suitable nonionic surfactants include those used for the emulsification of paraffin as stated above.

It is also possible to use polyvinyl alcohol as a protective colloid. The amount of the nonionic surfactant to be used is usually in the range of 1 – 10 wt. parts per 100 wt. parts of the monomer used for the polymer emulsion. The polymer emulsions are usually prepared by emulsion polymerization of the monomer with a water soluble polymerization initiator in the presence of a nonionic surfactant.

Suitable water soluble polymerization initiators include the conventional oxidizing agents such as potassium persulfate, ammonium persulfate, hydrogen peroxide and the redox type catalysts such as mixtures of said oxidizing agents and an organic or inorganic reducing agent, e.g., L-ascorbic acid, Rongalit, sodium bisulfite or ferrous chloride and the like.

The paraffin emulsion compositions suitable for use in the process of this invention are mixtures of the paraffin emulsion and the polymer emulsion at a ratio of from 95:5 to 40:60, preferably from 93:7 to 70:30, by weight, respectively, of the solid components.

When the ratio is out of range, it is difficult to attain sufficient synergistic effects. The reason is not clear but the inventors have speculated as follows.

The paraffin particles in the paraffin emulsion have the minimum surface area in the constant volume so as to be spherical and the emulsifier is orientated on the surface of the particles.

When the polymer emulsion is added to it and the mixture is dried, the paraffin particles are deformed, becoming flat during the film formation of the polymer in the polymer emulsion, whereby the surface area of paraffin particles is increased thereby forming parts of the surface of the paraffin which are not covered with the emulsifier, and these parts impart the water repellency. The term solid components in the paraffin emulsion and in the polymer emulsion refer respectively to the solid components obtained by removing water and other volatile matter by heating the paraffin emulsion and the polymer emulsion by conventional methods.

There is no special criticality regarding the method used for mixing the paraffin emulsion and the polymer emulsion. They can be mixed before use, and it is preferred to uniformly mix them they are mixed with gypsum. The compositions of this invention include the water repellent component prepared as mentioned above and gypsum.

Suitable gypsums for use in the compositions of this invention include α-hemihydrate, β-hemihydrate and hydraulic anhydride gypsum. It is also possible to combine other known additives such as aritifical light weight aggregates such as pearlite, vermiculite, Shirasuballoon (microballoon), etc., various blowing agents, reinforcing materials such as glass fibers; asbestos, rock wool, etc.; various hardening speed modifiers for gypsum and the like.

In the preparation of the compositions of this invention, the oxidized paraffin-containing paraffin emulsion, or the paraffin emulsion composition containing mixtures of the paraffin emulsion and the polymer emulsion, as the water repellent component, is added to a calcined gypsum or to a slurry of calcined gypsum and water, the mixture is setted, and if desired is dried.

The water repellent component is added in a ratio of 1 - 20 wt. parts, preferably 1 - 15 wt. parts, especially 2 - 15 wt. parts, of the solid components of the paraffin emulsion or the paraffin emulsion composition per 100 wt. parts of gypsum.

When the amount of solid component is smaller than said range, the desired effect is not attained. On the other hand, when the amount of the solid component is higher than said range, the flame resistance and economical advantages of gypsum compositions are lost.

The amount of water to be added to the hemihydrate gypsum or the mixture thereof is generally determined by Japanese Industrial Standard R 9112 (1956), but it is not critical and can be determined as desired. When the amount of water contributed by the emulsions of the water repellent components is not sufficient, water is added so as to control the total water content of the hemihydrated gypsum and mixtures thereof.

There is no difference in the mixing, casting and drying operations for the gypsum slurry containing the water repellent component in this invention and the conventional operations for preparing gypsum compositions. Thus gypsum compositions are easily preparable.

The gypsum products such as gypsum board can be prepared by the conventional methods by using the compositions of this invention.

The water repellent gypsum compositions of this invention have the following unexpected characteristics.

a. In comparison with the results obtained when the conventional water repellent agents are used, the products prepared by using the gypsum compositons of this invention containing the oxidized paraffin-containing paraffin or the paraffin emulsion composition, have excellent physical properties in wet conditions and have high water resistance.

b. In the gypsum compositions containing the paraffin emulsion composition of a mixture of the paraffin emulsion and the polymer emulsion, further higher water resistance can be imparted by the synergistic effect between the paraffin emulsion and the polymer emulsion.

c. In comparison with the products using an asphalt type water repellent agent which is the most effective conventional technique for preparing gypsum products, the gypsum products prepared by using the gypsum compositions of the invention have superiority at water resistance and other physical properties such as strength and processibility.

d. In comparison with the cases using the conventional water repellent agents, the adhesiveness between the paper and the core of the gypsum products is remarkably high and the paper is not peeled off.

The invention will be further illustrated in detail by certain examples and comparative tests and references wherein the terms "part" and "percent" mean part by weight and percent by weight.

Reference 1

Preparation of paraffin emulsion a. Paraffin emulsion (a) used for the invention:

| | |
|---|---|
| Sodium hydroxide | 0.2 part |
| Paraffin having melting point of 68.3° C | 80 parts |
| Oxidized paraffin having acid value of 28 and melting point of 67° C | 20 parts |
| Sorbitane monostearate | 0.25 part |
| Polyoxyethyleneoleyl ether | 0.75 part |

The flask containing said components was heated to 80° C. A 200 parts of a pure water was added dropwised to the mixture which was vigorously stirred by a homomixer to result a phase inversion so as to obtain the paraffin emulsion (a) (the oxidized paraffin-containing emulsion; a solid content of 33%) for 30 minutes.

b. Paraffin emulsion (b) used in the invention:

In accordance with the above-mentioned process (a) except using 90 parts of the paraffin having a melting point of 68.3° C and 10 parts of the oxidized paraffin having an acid value of 28 and a melting point of 67° C, the paraffin emulsion (b) (the oxidized paraffin-containing emulsion; a solid content of 33%) was obtained.

c. Paraffin emulsion (c-1) used in the invention:

In accordance with the above-mentioned process (a) except using no surfactant (sorbitane monostearate and polyoxyethyleneoleyl ether), the paraffin emulsion (c-1) (the oxidized paraffin-containing emulsion; a solid content of 33%) was obtained.

Paraffin emulsion (c-2) used in the invention:

| | |
|---|---|
| Sodium hydroxide | 0.2 part |
| Paraffin having a melting point 68.3° C | 90 parts |
| Oxidized paraffin having an acid value of 28 and a melting point of 67° C | 10 parts |
| Sucrose monopalmitate | 3.75 parts |
| Sucrose distearate | 1.25 parts |

The flask containing said components was heated to 80° C. A 200 parts of a pure water was added dropwise to the mixture which was vigorously stirred for 30 minutes by a homomixer, to result a phase inversion so as to obtain the paraffin emulsion (c-2). (The oxidized paraffin-containing emulsion; a solid content of 33%).

Paraffin emulsion (c-3) used in the invention:

In accordance with the above-mentioned process (a) except using the components used in the process (b), the emulsification was conducted to obtain the paraffin emulsion (c-3). (The oxidized paraffin-containing emulsion; a solid content of 33%).

Paraffin emulsion (d) used in the comparative test:

| | |
|---|---|
| Paraffin having melting point of 56.7° C | 100 parts |
| Sorbitane monostearate | 4.4 parts |
| Polyoxyethyleneoleyl ether | 5.6 parts |

The flask containing said components (no oxidized paraffin) was heated to 70° C.

A 200 parts of a pure water was added dropwise to the mixture which was vigorously stirred by a homomixer, to result a phase inversion so as to obtain the paraffin emulsion (d) (the paraffin emulsion containing no oxidized paraffin; a solid content of 33%) for 30 minutes.

Reference 2

Preparation of polymer emulsion (water repellent auxiliary agent)

A. Polymer emulsion A (acrylic acid ester type)

| | |
|---|---|
| Pure water | 100 parts |
| Methyl methacrylate | 30 parts |
| n-Butyl acrylate | 70 parts |
| Potassium persulfate | 0.5 part |
| Polyoxyethylenesorbitane monostearate | 2.5 parts |
| Polyethyleneglycol monolaurate | 2.5 parts |
| Sodium bisulfite | 0.1 part |

The above-mentioned components were charged in a 300 ml four necked flask equipped with a stirrer, and were stirred at 300 r.p.m. at 50° C for 6 hours in a nitrogen atmosphere to result the polymerization. The solid content of the polymer emulsion was 50%.

B. Polymer solution (B) (Urea type)

| | |
|---|---|
| Urea (3 mole) | 180 parts |
| Formaline 37% aq. solution (4.8 mole) | 390 parts |
| Hexamethylenetetramie (3.3 wt.% to urea) | 6 parts |

The above-mentioned components were charged in a separatory flask equipped with a stirrer, and heated at 45° C for 7 hours to conduct the polymerization reaction.

The solid content was 56.9%.

C. Polymer emulsion C (asphalt type)

The commercial asphalt emulsion (Catiozol GM manufactured by Nichireki Kagaku K.K.) which has a solid content of 55% was used.

D. Polymer emulsion D (asphalt type)

The commercial asphalt emulsion (Catiozol CPE-1 manufactured by Nichireki Kagaku K.K.) which has a solid content of 55% was used.

EXAMPLES 1 - 17

The paraffin emulsions (containing the oxidized paraffin) of Reference 1 or various mixtures of the paraffin emulsion of Reference 1 and the polymer emulsion of Reference 2 were respectively admixed with each slurry of 100 parts of β-hemihydrate gypsum (Sakura Jirushi A grade manufactured by Yoshino Gypsum Co., Ltd.) and 80 parts of water (including water component in the emulsion) at a solid component ratio of the paraffin emulsion to the polymer emulsion and at a total organic solid content to 100 parts of β-hemihydrate gypsum, which are stated in Table 1. Each mixture was uniformly mixed at room temperature, and was charged in a cast and dried at 70° C for 24 hours to prepare each sample. Each sample comprising a core and paper for gypsum board adhered on both of surfaces of the core was used as a sample for water resistant test and a sample for evaluating adhesiveness between the paper and the core.

In the water-resistant test, each sample was dipped in water at 20° C for the time shown in Table 1 and the change of weight of the sample was measured.

In the test for evaluating adhesiveness between the paper and the core, the test was conducted by Japanese Industrial Standard A-6901.

The results of the tests are shown in Table 1 together with the results of the comparative tests.

Comparative Test 1

A slurry of 800 parts of β-hemihydrate gypsum and 640 parts of a pure water (without the paraffin emulsion nor the polymer emulsion) was charged in a cast and was dried to result a sample. The same tests were conducted. The results are shown in Table 1.

Comparative Test 2

The process of Example 1 was repeated except using only polymer emulsion of Reference 2. The results are shown in Table 1.

Comparative Tests 3 to 7

The process of Example 1 was repeated except using the paraffin emulsion (d) (no oxidized paraffin containing emulsion) of Reference 1. The results are shown in Table 1.

It is clearly understood that the gypsum boards prepared by using the oxidized paraffin-containing emulsion or the paraffin emulsion compositions of the invention (the mixture of the oxidized paraffin-containing emulsion and the polymer emulsion) had remarkably superiority on the water resistance and the adhesiveness between the core and the paper. In the examples of Table 1, the gypsum boards prepared by using the paraffin emulsion compositions (Examples 5, 6, 8 - 12 and 14) had excellent water-resistance and also high adhesiveness between the core and the paper. Accordingly, it is clear that the synergical effects of the paraffin emulsion and the polymer emulsion were given.

Table 1

| | Water-repellent gypsum board | | | | | | |
|---|---|---|---|---|---|---|---|
| Example or Comparative test | Exp. 1 | Exp. 2 | Exp. 3 | Exp. 4 | Exp. 5 | Exp. 6 | Exp. 7 |
| Conditions for imparting water resistance | | | | | | | |
| Type of the Paraffin emulsion | b | b | b | b | b | b | a |
| Type of the polymer emulsion | — | — | — | — | A | A | — |
| Solid ratio of the paraffin emulsion to the polymer emulsion | 100 : 0 | 100 : 0 | 100 : 0 | 100 : 0 | 80 : 20 | 60 : 40 | 100 : 0 |

Table 1-continued

| Water-repellent gypsum board | | | | | | | |
|---|---|---|---|---|---|---|---|
| Total organic solid content to 100 parts of hemihydrate gypsum (part) | 2.5 | 3.0 | 4.0 | 5.0 | 5.0 | 5.0 | 2.5 |
| Water resistance weight increase by water absorption (%) | | | | | | | |
| 6 hours | 6.9 | 10.5 | 6.3 | 4.2 | 3.0 | 3.6 | 7.0 |
| 24 hours | 13.4 | 12.2 | 7.5 | 5.0 | 3.4 | 5.0 | 11.0 |
| 48 hours | 19.0 | 15.0 | 8.0 | 5.4 | 4.3 | 5.7 | 16.0 |
| Adhesiveness between paper and core | ◉ | ◉ | ○ | ○ | ◉ | ◉ | ◉ |

| Example or Comparative test | Exp. 8 | Exp. 9 | Exp. 10 | Exp. 11 | Exp. 12 | Exp. 13 | Exp. 14 |
|---|---|---|---|---|---|---|---|
| Conditions for imparting water resistance | | | | | | | |
| Type of the Paraffin emulsion | a | a | a | a | a | c-1 | c-1 |
| Type of the polymer emulsion | A | B | B | C | D | — | A |
| Solid ratio of the paraffin emulsion to the polymer emulsion | 80 : 20 | 80 : 50 | 50 : 50 | 50 : 50 | 50 : 50 | 100 : 0 | 80 : 20 |
| Total organic solid content to 100 parts of hemihydrate gypsum (part) | 5.0 | 5.0 | 10.0 | 5.0 | 5.0 | 5.0 | 5.0 |
| Water resistance weight increase by water absorption (%) | | | | | | | |
| 6 hours | 3.1 | 7.1 | 4.2 | 7.5 | 6.0 | 3.1 | 2.7 |
| 24 hours | 3.6 | 9.2 | 6.6 | 11.5 | 7.8 | 4.5 | 3.5 |
| 48 hours | 4.2 | 13.0 | 11.0 | 15.0 | 10.8 | 5.8 | 5.2 |
| Adhesiveness between paper and core | ◉ | ◉ | ◉ | ○ | ○ | ○ | ○ |

| Example or Comparative test | Exp. 15 | Exp. 16 | Exp. 17 |
|---|---|---|---|
| Conditions for imparting water resistance | | | |
| Type of the Paraffin emulsion | c-2 | c-3 | b |
| Type of the polymer emulsion | — | — | — |
| Solid ratio of the paraffin emulsion to the polymer emulsion | 100 : 0 | 100 : 0 | 100 : 0 |
| Total organic solid content to 100 parts of hemihydrate gypsum (part) | 5.0 | 5.0 | 1.5 |
| Water resistance weight increase by water absorption (%) | | | |
| 6 hours | 3.3 | 4.2 | 9.5 |
| 24 hours | 5.1 | 6.0 | 22.5 |
| 48 hours | 5.6 | 9.2 | 29.5 |
| Adhesiveness between paper and core | ◉ | ○ | ○ |

| Example or Comparative test | Comp. test 1 | Comp. test 2 | Comp. test 3 | Comp. test 4 | Comp. test 5 | Comp. test 6 | Comp. test 7 |
|---|---|---|---|---|---|---|---|
| Conditions for imparting water resistance | | | | | | | |
| Type of the Paraffin emulsion | — | — | d | d | d | d | |
| Type of the polymer emulsion | — | A | — | — | D | A | B |
| Solid ratio of the paraffin emulsion to the polymer emulsion | — | 0 : 100 | 100 : 0 | 100 : 0 | 50 : 50 | 50 : 50 | 50 : 50 |
| Total organic solid content to 100 parts of hemihydrate gypsum (part) | — | 5.0 | 2.5 | 5.0 | 6.0 | 5.0 | 5.0 |
| Water resistance weight increase by water absorption (%) | | | | | | | |
| 6 hours | 45 | 43 | 46 | 30 | 6.7 | 80 | 75 |
| 24 hours | 45 | 43 | 57 | 50 | 14.2 | 85 | 80 |
| 48 hours | 46 | 45 | 57 | 50 | 20.8 | — | — |
| Adhesiveness between paper and core | ○ | ◉ | △ | △ | △ | ○ | ○ |

Note:
◉ : excellent;
○ : high
△ : low

What is claimed as new and intened to be covered by letters patent is:

1. A water repellent gypsum composition, which consists essentially of:

a mixture of 100 parts by weight of a gypsum material per 1-20 parts by weight based on the solids content of a paraffin emulsion prepared by emulsifying
A. a paraffin hydrocarbon having a melting point of 40°-80° C and
b. an oxidized paraffin having an acid value of 10-70 at a ratio of from 97:3 to 50:50 by weight, respectively in the presence of a water soluble alkali or ammonium ion base.

2. The water repellent gypsum composition of claim 1, wherein the melting point of the oxidized paraffin is 30° – 90° C.

3. The water repellent gypsum composition of claim 1, wherein the water soluble alkali or ammonium ion base is an alkali metal hydroxide or carbonate or ammonium hydroxide.

4. The water repellent gypsum composition of claim 1, wherein an emulsifier is added in the emulsification of said paraffin hydrocarbon and oxidized paraffin.

5. The water repellent gypsum composition of claim 4, wherein the emulsifier is a nonionic surfactant, and the amount of the emulsifier is in the range of 0 – 5 wt. parts per 100 wt. parts of the total amount of the paraffin hydrocarbon and the oxidized paraffin.

6. A water repellent gypsum composition, which consists essentially of:

a mixture of said gypsum, and said paraffin emulsion of claim 1 and a polymer emulsion or solution, wherein the weight ratio of the solid components of said paraffin emulsion to said polymer emulsion or solution ranges from 95:5 to 40:60, and wherein said polymer of said polymer emulsion is an acrylic acid ester polymer, a vinyl acetate homopolymer or copolymer, a urea polymer or an asphalt emulsion.

7. The water repellent gypsum composition of claim 6, wherein the polymer emulsion or solution has the minimum film forming temperature of less than 80° C.

8. The water repellent gypsum composition of claim 6, wherein a nonionic surfactant is added to the polymer emulsion or solution at a ratio of 1 – 10 wt. parts per 100 wt. parts of the polymer solid component.

9. A gypsum product which is prepared by casting and setting the water repellent gypsum composition of claim 1.

10. The gypsum product of claim 9, wherein surface paper is adhered before the water repellent gypsum composition is hardened.

11. A method of forming a water repellent gypsum composition which comprises emulsifying the paraffin emulsion composition of claim 1 and adding the emulsion to a gypsum.

* * * * *